(12) United States Patent
Moster et al.

(10) Patent No.: US 6,368,209 B2
(45) Date of Patent: Apr. 9, 2002

(54) AGRICULTURAL COMBINE WITH STONE TROUGH BEATER ARRANGEMENT

(75) Inventors: Vincent M. Moster, Moline; Jon E. Ricketts, Viola, both of IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/413,000

(22) Filed: Oct. 5, 1999

(51) Int. Cl.⁷ .......................... A01F 12/16; A01D 75/18
(52) U.S. Cl. .......................................... 460/105; 460/16
(58) Field of Search ................................. 460/105, 106, 460/16, 70

(56) References Cited

U.S. PATENT DOCUMENTS

| | | |
|---|---|---|
| 3,537,460 A | 11/1970 | VanBuskirk |
| 3,827,443 A | 8/1974 | Drayer |
| 4,170,235 A | 10/1979 | Ashton et al. |
| 4,209,024 A | 6/1980 | Powell et al. |
| 5,186,683 A * | 2/1993 | Farley et al. ............... 460/105 |
| 5,346,429 A | 9/1994 | Farley |
| 5,368,522 A | 11/1994 | Ricketts et al. |
| 5,733,192 A | 3/1998 | Jones |
| 5,772,503 A | 6/1998 | Janzen et al. |

* cited by examiner

Primary Examiner—Robert E. Pezzuto
Assistant Examiner—Nathan Mammen
(74) Attorney, Agent, or Firm—Richard G. Lione; Brinks Hofer Gilson & Lione

(57) ABSTRACT

An agricultural combine feeder assembly and rotor interface wherein the feeder assembly includes front and rear housing section connected by a pivot. The front section contains a conveyor while the rear section contains a rotating beater. The rearmost extremity of the beater is spaced from 5 to 16 inches from the forwardmost extremity of the impeller blade or blades on the front end of the rotor.

1 Claim, 2 Drawing Sheets

AGRICULTURAL COMBINE WITH STONE TROUGH BEATER ARRANGEMENT

FIELD OF THE INVENTION

The present invention relates generally to agricultural combines. It relates particularly to axial-flow, rotary combines and the feeding of crop material from the combine's header assembly to its rotary threshing assembly.

BACKGROUND OF THE INVENTION

In the Ricketts et al. U.S. Pat. No. 5,368,522, assigned to the same assignee as the present invention, a combine is described wherein the rearwardmost extremity of a rotating feeder element is placed from 5 to 16 inches, and preferably about 7 inches, from the forwardmost extremity of the impeller blade or blades on a rotary threshing assembly. In the instances where a feeder assembly includes a rotary beater feeder element between the impeller blades and the rearwardmost sprocket member of a feeder conveyor, the axis of rotation of the beater is forward of the pivot axis which connects the feeder housing to the combine frame.

The afore-described arrangement was thought to provide the optimum relationship of components for highly effective crop feeding to the rotary threshing assembly. The applicant has now designed an improvement on that arrangement, however.

SUMMARY OF THE INVENTION

It is an object of the present invention to provide an improvement in an agricultural combine.

It is another object to provide an improvement in an agricultural combine which substantially eliminates problems normally encountered in transitioning a crop material mat from feeder elements to rotor elements.

The foregoing and other objects are realized in a combine feeder assembly and rotor interface including a feeder housing having a front section and a rear section, interconnected in a pivot axis. The front section contains an elongated conveyor. The rear section contains a beater. The rearmost extremity of the beater is spaced from 5 to 16 inches and preferably about 7 inches from the forwardmost extremity of the impeller blade or blades on the front end of the rotor in the axial-flow threshing assembly.

BRIEF DESCRIPTION OF THE DRAWINGS

The invention, including its construction and method of operation, is illustrated more or less diagrammatically in the drawings, in which.

DESCRIPTION OF THE PREFERRED EMBODIMENT

Figure 1:
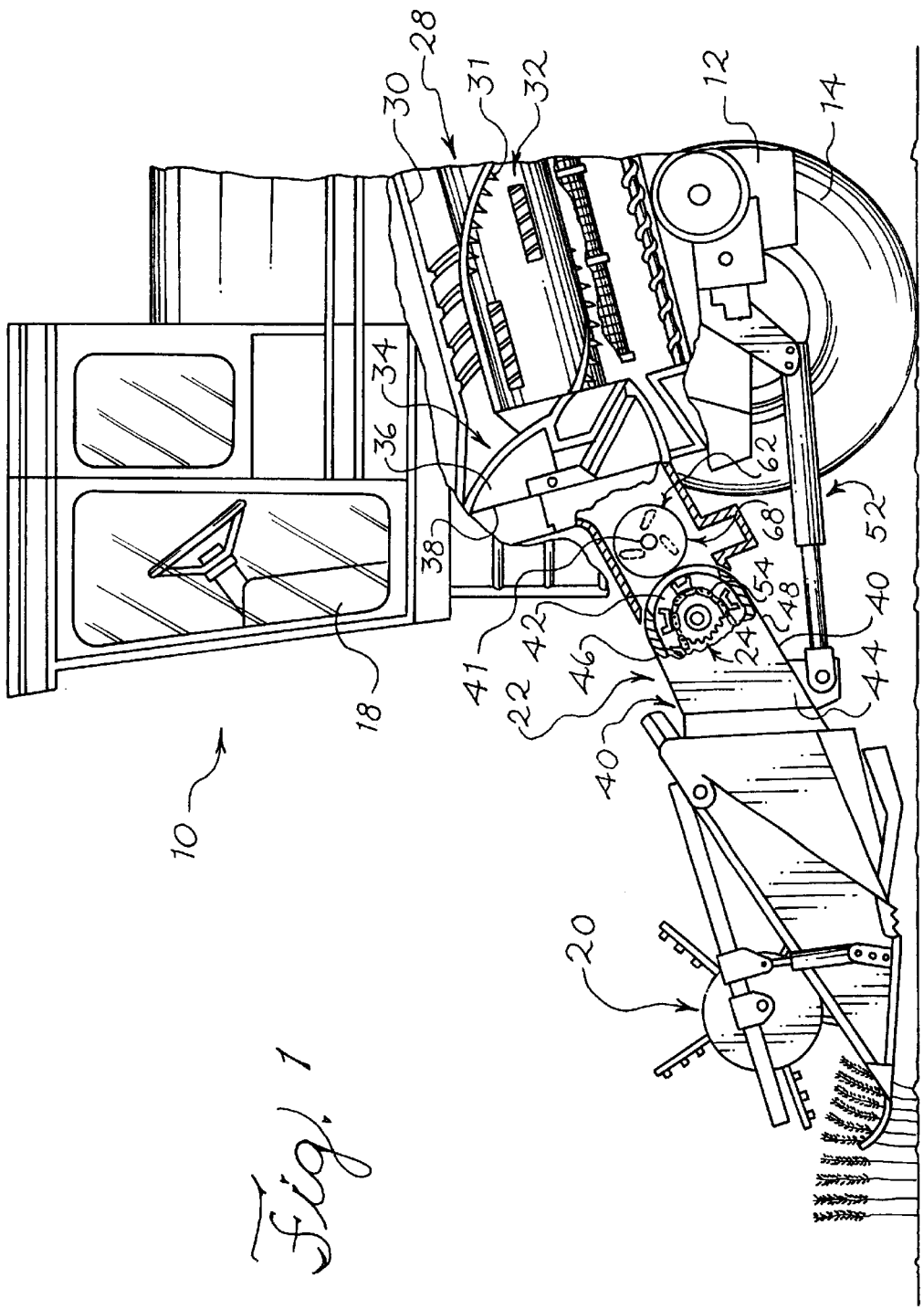
FIG. 1 is a side elevational view, partly in section of an axial-flow combine incorporating the improved combination of feeder, threshing rotor and chassis or frame of the invention.

Referring now to the drawings, and particularly to FIG. 1, there is shown a self-propelled rotary combine 10. The combine 10 includes a frame 12 supported by front wheels 14 (the rear wheels are not shown). An operators cab 18 is mounted on the frame 12 over the wheels 14.

The combine 10 is operatively powered by an engine (not shown), suitably supported on the frame 12. The transfer of power from the engine to various driven components of the combine is conventional in nature and could include fixed, variable belt or chain drives which are not shown or described but are well known in the art.

At its front end, the combine 10 is provided with a crop harvesting header assembly 20 for severing and gathering crop materials. The header assembly 20 cuts and directs crop materials toward a crop feeder assembly 22 including a conveyor 24. The conveyor 24 moves crop materials in a crop layer or mat toward a rotary threshing assembly 28 which threshes the grain from materials other than grain.

The threshing assembly 28 is supported in a conventional manner on the frame 12 of the combine 10 and embodies crop threshing and separating means in a single unit. More specifically, the assembly 28 includes a generally tubular rotor casing or housing 30 mounted in a fore-and-aft direction on the frame 12 of the combine 10. A generally cylindrical rotor 31 is arranged coaxially within the casing 30. The rotor 31 has a plurality of threshing elements 32 mounted circumferentially around, and longitudinally along, its outer surface.

At its forward end, the rotor 31 includes an impeller blade sub-assembly 34 for drawing air and crop materials into and through the rotary threshing assembly 28. The impeller blade sub-assembly 34 includes a plurality of substantially identical impeller blades 36 which are secured to the rotor 31 and are equally spaced relative to each other. The impeller blades 36 of the impeller sub-assembly 34 may take different shapes, depending upon the particular manufacturer and other criteria. Nevertheless, each impeller blade 36 has a leading edge 38 which lies in a plane extending generally normal to the rotational axis of the rotor 31. As will be appreciated, upon rotation of rotor 31, the impeller blade sub-assembly 34 also rotates.

Figure 2:
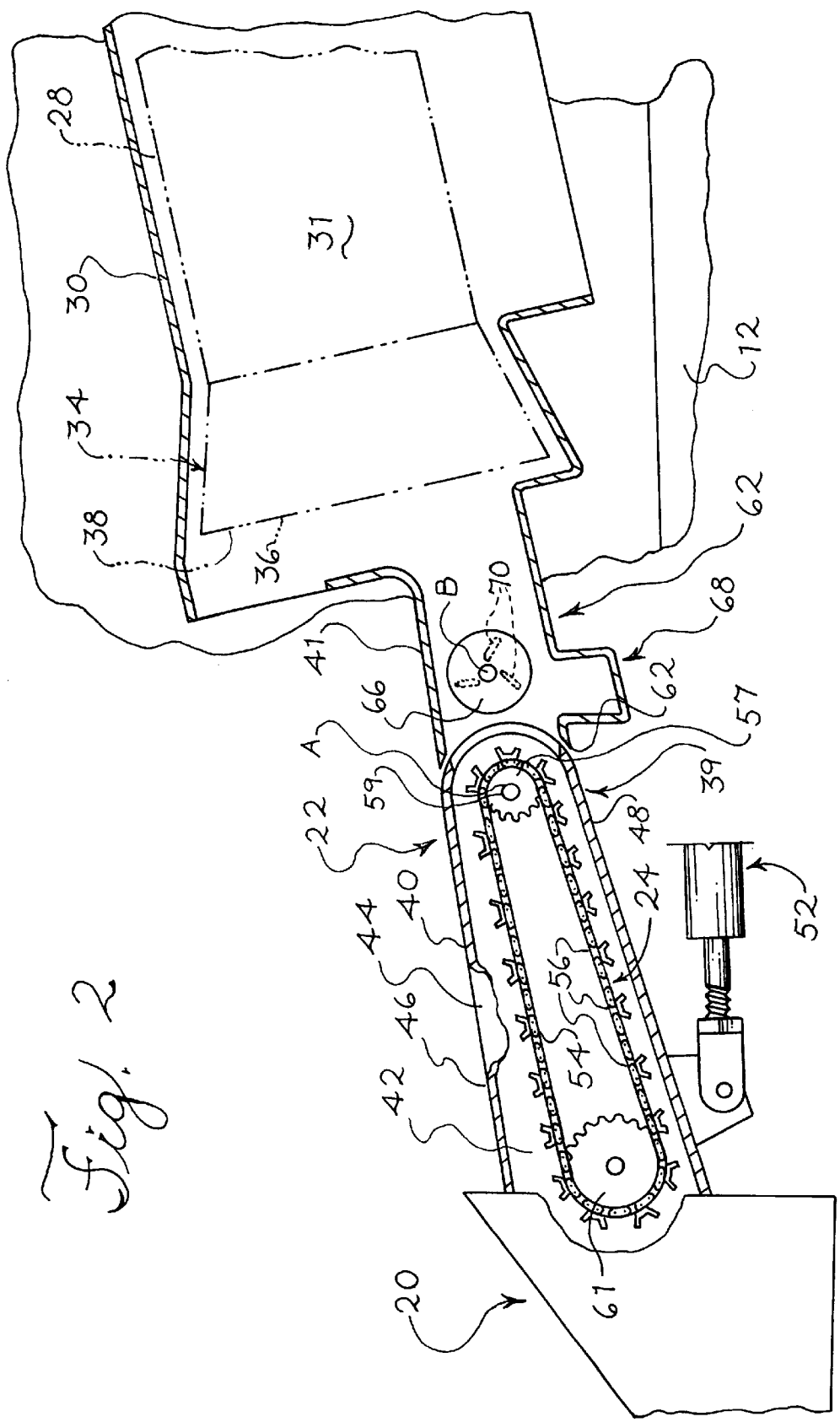
FIG. 2 is an enlarged side elevational view, partly in section of the improved combination seen in FIG. 1.

Referring now to FIG. 2, as well as FIG. 1, the feeder assembly 22 includes a housing 39 having a front section 40 which encloses the conveyor 24 and a rear section 41. The housing section 40 includes a pair of sidewalls 42 and 44 which are rigidly joined to each other by top and bottom walls 46 and 48 respectively. The sidewalls 42 and 44 are transversely spaced between about 35 inches and about 55 inches (or more) apart, depending upon the particular combine design.

The feeder housing section 40 is joined at a forward end 49 to the crop harvesting header assembly 20. Toward a rear end, the feeder housing section 40 is pivotally connected to the feeder housing rear section 41 on a pivot axis A. The rear section 41 is rigidly connected to the frame 12. The feeder housing section 40, with the crop harvesting header assembly 20 affixed to the forward end thereof, is vertically movable about the axis A by a hydraulic cylinder 52 selectively operable from the operator station 16.

The conveyor 24 of the feeder assembly 22 receives crop materials from the crop harvesting header assembly 20 at a forward end and discharges the crop materials at a rearward end. The conveyor 24 includes a plurality of transversely spaced, endless chains 54 having a series of elongated slats or crossbars 56 which span the distance between the chains 54. The slats 56 are connected in a conventional manner to the chains 54, so as to be driven thereby.

The endless chains 54 are entrained for orbital rotation about a pair of longitudinally spaced, rotatable chain supports 58 and 61. In the illustrated embodiment, rotatable chain support 58 defines a rotary-drive including a plurality of laterally spaced sprockets 57 (only one shown) secured along the length of a driven shaft 59. The shaft 59 is supported on the axis A by the respective sidewalls of the feeder housing section 40. Securing all the sprockets 57 to a common drive shaft ensures that the chains 54 will be driven in unison relative to each other. The rotatable chain support 61 serves as an idler.

According to the invention, the feeder assembly 22 includes a stone trap 62 provided in the housing rear section 41 between the discharge end of the conveyor 24 and the rotor assembly 28, to inhibit the introduction of foreign articles such as stones, rocks, or the like into the threshing area. The stone trap 62 includes a rotary driven beater 66 arranged in a cooperative relationship with a stone receiving trough 68. The beater 66 includes a plurality of radial blades or vanes 70. The driven beater 66 is supported at opposite ends in the rear section 41 for rotation about transverse axis B.

During operation of the combine 10, unthreshed crop materials are moved rearwardly in a linear fashion between the conveyor 24 and the bottom wall 48 of the feeder housing 40. As the crop materials move rearwardly, they are generally in the form of a cohesive sheet or mat. The crop materials are linearly driven toward the rotor assembly 28 as the chains 54 orbit around the sprockets 57 of the chain support 58.

The crop materials are discharged onto the beater 62. If the crop layer or mat of unthreshed crop materials contains any foreign articles having a mass, such as small stones or rocks, the vanes 70 of the beater 66 engage them and forcibly drive them into the trough 68, thereby preventing their introduction into the rotor assembly.

According the present invention, the transverse axis B of the beater 66 is longitudinally displaced upstream (rearwardly) of the transverse pivotal axis A about which the header assembly 20 vertically moves. It is been found that providing a transitional area of 5 to 16 inches between the rearwardmost extremity of the vanes 70 in the beater 66 discharge end of the feeder assembly 22 and the leading edge or forwardmost extremity of the impeller blade assembly 34 allows the movement of crop materials to translate smoothly from a linear flow imparted to the materials by the feeder assembly 22 to a rotary or circulatory flow imparted to the materials by the impeller blades 36 of the impeller blade assembly 34. In the preferred form of the invention, the transitional spacing between the rearwardmost extremity of the vanes 70 in the beater 66 of the feeder assembly 22, and a leading edge or forwardmost extremity of the impeller blade assembly 34, is about 7 inches.

While a preferred embodiment of the invention has been described, it should be understood that the invention is not so limited, and modifications may be made without departing from the invention. The scope of the invention is defined by the appended claims, and all devices that come within the meaning of the claims, either literally or by equivalence, are intended to be embraced therein.

What is claimed is:

1. An axial flow, rotary combine, comprising:

a) a mobile frame assembly;

b) a rotor assembly mounted on said frame assembly for receiving and processing crop materials, said rotor assembly including a rotor which rotates around a longitudinal axis and has an impeller blade at its forward end;

c) a header assembly in front of said frame assembly for reaping crop materials as the combine is driven across a crop field;

d) a feeder assembly for receiving crop materials from said header assembly and discharging said crop materials into said rotor assembly;

e) said feeder assembly including a front section and a rear section, said rear section being rigidly mounted on said mobile frame assembly in front of said rotor assembly and said front section being in front of said rear section and pivotally connected to said rear section for movement relative to said rear section about a horizontal pivot axis extending transversely of said feeder assembly;

f) said rear section containing a stone trough and a beater above said stone trough, said beater having a plurality of radial vanes and mounted in said rear section for rotation about an axis transverse to said rotor, the rearward most extremity of said radial vanes when they rotate being at least 5 inches and no more than 16 inches from the forward most extremity of said impeller blade when it rotates with said rotor;

g) said front section containing a conveyor extending between forward and rearward rotatable elements, said rearward rotatable element being rotatable about said transversely extending horizontal pivot axis;

h) said horizontal pivot axis being spaced forwardly of said beater axis.

* * * * *